United States Patent
Zhao et al.

(10) Patent No.: US 10,044,544 B2
(45) Date of Patent: Aug. 7, 2018

(54) ALAMOUTI MAPPING FOR USE IN REAL FIELD ORTHOGONAL FBMC MODULATION SYSTEMS

(71) Applicant: Huawei Technologies Duesseldorf GmbH, Duesseldorf (DE)

(72) Inventors: Zhao Zhao, Munich (DE); Tao Ding, Shenzhen (CN); Malte Schellmann, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 15/627,118

(22) Filed: Jun. 19, 2017

(65) Prior Publication Data

US 2017/0288926 A1 Oct. 5, 2017

Related U.S. Application Data

(63) Continuation of application No. PCT/EP2014/078735, filed on Dec. 19, 2014.

(51) Int. Cl.
*H04L 27/26* (2006.01)
*H04L 1/06* (2006.01)

(52) U.S. Cl.
CPC .......... *H04L 27/264* (2013.01); *H04L 1/0625* (2013.01); *H04L 1/0668* (2013.01)

(58) Field of Classification Search
CPC ... H04L 1/0643; H04L 1/0668; H04L 1/0618; H04L 27/264; H04L 1/0625

(Continued)

(56) References Cited

U.S. PATENT DOCUMENTS

| 2004/0132496 A1* | 7/2004 | Kim | H04B 7/0669 |
| | | | 455/562.1 |
| 2006/0093066 A1* | 5/2006 | Jeong | H04L 1/0001 |
| | | | 375/299 |

(Continued)

OTHER PUBLICATIONS

Zakaria et al., "A Novel Filter-Bank Multicarrier Scheme to Mitigate the Intrinsic Interference: Application to MIMO Systems," IEEE Transactions on Wireless Communications, vol. 11, No. 3, pp. 1112-1123, Institute of Electrical and Electronics Engineers, New York, New York (Mar. 2012).

(Continued)

*Primary Examiner* — Emmanuel Bayard
(74) *Attorney, Agent, or Firm* — Leydig, Voit & Mayer, Ltd.

(57) ABSTRACT

The disclosure relates to a new Alamouti-based mapping scheme for use in a real field FBMC modulation system which can reduce FBMC-intrinsic interference and allows approaching optimal performance. The Alamouti-based mapping scheme proposed herein can be used for implementing space-time or space-frequency block codes (STBC/SFBC) codes. The proposed Alamouti-based mapping scheme suggests specific patterns to negate/invert signs of the modulation symbols of Alamouti pairs in the Alamouti mapping. By using these special patterns of sign negation, the FBMC-intrinsic interference can be reduced significantly so that it may become possible to use conventional Alamouti demapping/decoding procedures on the receiving side with an overall acceptable performance in real life systems.

15 Claims, 13 Drawing Sheets

(58) Field of Classification Search
USPC .................................. 375/267, 299, 347, 349
See application file for complete search history.

(56) References Cited

U.S. PATENT DOCUMENTS

| | | | |
|---|---|---|---|
| 2007/0064830 A1* | 3/2007 | Choi .................... | H04B 7/0634 375/267 |
| 2007/0183527 A1* | 8/2007 | Jia ........................ | H04B 7/0669 375/267 |
| 2008/0080434 A1* | 4/2008 | Wolf .................... | H04B 7/0413 370/338 |
| 2009/0252248 A1* | 10/2009 | Ghosh ................... | H04L 1/0071 375/267 |
| 2010/0046657 A1* | 2/2010 | Karlsson ............... | H04L 1/0606 375/267 |
| 2011/0002408 A1 | 1/2011 | Javaudin | |
| 2011/0228758 A1* | 9/2011 | Hammarwall ...... | H04L 27/2614 370/344 |
| 2014/0348252 A1 | 11/2014 | Siohan et al. | |
| 2017/0324517 A1* | 11/2017 | Novak ................ | H04L 27/2628 |

OTHER PUBLICATIONS

Renfors et al., "A Block-Alamouti Scheme for Filter Bank Based Multicarrier Transmission," 2012 European Wireless Conference, pp. 1031-1037, Institute of Electrical and Electronics Engineers, New York, New York (2010).

* cited by examiner

ALAMOUTI MAPPING FOR USE IN REAL FIELD ORTHOGONAL FBMC MODULATION SYSTEMS

CROSS-REFERENCE TO RELATED APPLICATIONS

This application is a continuation of International Application No. PCT/EP2014/078735, filed on Dec. 19, 2014, the disclosure of which is hereby incorporated by reference in its entirety.

FIELD OF INVENTION

The disclosure relates to methods, devices and computer-readable media for transmitting data in a real field orthogonal FBMC modulation system using an improved Alamouti mapping scheme that reduces the FBMC-intrinsic interference.

TECHNICAL BACKGROUND

Filterbank Multicarrier (FBMC) transmission with Offset Quadrature-Amplitude Modulation (OQAM) is one of the candidate transmission schemes for future wireless system (e.g. 5G). In contrast to state-of-the-art CP-OFDM (cyclic-prefix orthogonal frequency division multiplexing) transmission, which is used in LTE, FBMC/OQAM system is advantageous in the aspects of better controlling the out-of-band radio power leakage and achieving higher spectral efficiency.

In baseband discrete time model, with M subcarriers, we can write the FBMC/OQAM signal at the transmitter side as follows:

$$s[t] = \sum_{k=0}^{M-1} \sum_{n=-\infty}^{+\infty} c_{k,n} p_{T,k}[t - nM] \quad (1)$$

Where $p_{T,k}[t]$ is the frequency shift version of prototype filter $p_T[t]$:

$$p_{T,k}[t] = p_T[t] e^{j\frac{2\pi}{M}k(t-D)} \quad (2)$$

Here $c_{k,n}$ is complex symbol (OQAM symbol) and can be represented as follows:

$$c_{k,n} = d_{k,2n} e^{j\varphi_{k,2n}} + d_{k,2n+1} e^{j\varphi_{k,2n+1}} \quad (3)$$

Within such equation, $d_{k,n}$ represent real valued symbol (PAM symbol) and the additional phase term $\varphi_{k,n}$ is aimed to add i alternatively in time as well as in frequency domain to contrast OQAM symbols. One example follows:

$$\varphi_{k,n} = (\pi/2)(k+n) \quad (4)$$

Hence, for simplicity, we can rewrite FBMC/OQAM signal at the transmitter side:

$$s[t] = \sum_{k=0}^{M-1} \sum_{n=-\infty}^{+\infty} d_{k,n} e^{j\varphi_{k,n}} p_T\left[t - n\frac{M}{2}\right] e^{j\frac{2\pi}{M}k(t-D)} \quad (5)$$

$$= \sum_{k=0}^{M-1} \sum_{n=-\infty}^{+\infty} d_{k,n} r_{k,n}[t]$$

With $$r_{k,n}[t] = p_T\left[t - n\frac{M}{2}\right] e^{j\frac{2\pi}{M}k(t-D)} e^{j\varphi_{k,n}}. \quad (6)$$

Thus, FBMC/OQAM signal can be treated as PAM modulated signal. Please note that, in this disclosure, we choose the PAM symbol models for presentation.

Assuming prototype filter being symmetrical and real-valued, the real field orthogonality is fulfilled as follows:

$$Re\{\sum_{t=-\infty}^{+\infty} r_{k',n'}[t] r^*_{k,n}[t]\} = \delta_{k,k'} \delta_{n,n'} \quad (7)$$

$Re\{.\}$ returns the real part of a complex number.

For MIMO-Alamouti transmission (Alamouti is a special case of space-time or space-frequency block code (abbreviated as STBC/SFBC in this disclosure), which is proposed by Alamouti in 1990s), however, it is very difficult for FBMC modulation schemes to combine the Alamouti Max-Ratio-Combing (MRC) decoder to fully achieve the antenna transmit diversity, since the complex field orthogonality requirement of Alamouti-MRC decoder cannot be fulfilled by FBMC.

More specifically, in Alamouti two complex (or real) symbols are transmitted as follows:
Antenna 1: $[d_1, -d_2^*]$
Antenna 2: $[d_2, d_1^*]$.

If in case the complex field orthogonality is fulfilled by the modulation, the corresponding received data block $[r_1, r_2]$ can be denoted as:

$$r_1 = h_1 d_1 + h_2 d_2 + n_1 \quad (8)$$

$$r_2 = h_1 d_2^* + h_2 d_1^* + n_2 \quad (9)$$

Here $h_1$ and $h_2$ denotes channel coefficients.
After Alamouti demapping at the receiver side, we observe:

$$\tilde{d}_1 = h_1^* r_1 + h_2 r_2^* = (|h_1|^2 + |h_2|^2) d_1 + \tilde{n}_1 \quad (10)$$

$$\tilde{d}_2 = h_2^* r_1 - h_1 r_2^* = (|h_1|^2 + |h_2|^2) d_2 + \tilde{n}_2 \quad (11)$$

Hence, two transmitted symbols are recovered achieving full transmit diversity.

When Alamouti is applied in an FBMC system, note that only real field orthogonally is fulfilled by FBMC. Thus, aforementioned MRC decoding cannot completely remove the interference between antennas. This fact will result in introducing interference on each modulated symbol and thus FBMC-Alamouti mapping inacceptable in any application. In the past a lot of effort has been made to solve this problem. However, so far there is no satisfying solution which can effectively cancel this inherent interference, even in flat fading channels.

SUMMARY

One object of the disclosure is to overcome the above mentioned problems with FBMC-Alamouti mapping. It is a further object to reduce the FBMC intrinsic interference when using Alamouti mapping on the transmitter side within in a real field orthogonal FBMC modulation system. It is another object to suggest an improved receiver side structure within the decoding path so as to allow for a (further) reduction of interference.

A first aspect of the disclosure suggest a new Alamouti-based mapping scheme for use in a real fields FBMC modulation system which can reduce FBMC-intrinsic interference and allows approaching optimal performance. The Alamouti-based mapping scheme proposed herein can be used for implementing space-time or space-frequency block codes (STBC/SFBC) codes. The proposed Alamouti-based mapping scheme suggests specific patterns to negate/invert signs of the modulation symbols of Alamouti pairs in the Alamouti mapping. By using these special patterns of sign negation, the FBMC-intrinsic interference can be reduced significantly so that it may become possible to use conventional Alamouti demapping/decoding procedures on the receiving side with an overall acceptable performance in real life systems.

A second aspect of the disclosure relates to an improvement of the performance at the receiver side. This second aspect can be used in combination with a transmission system operating according to the first aspect. According to this second aspect, an iterative interference cancellation (TIC) scheme with soft symbol estimation (SSD) introduced in the signal reconstruction path on the receiver side. Iterative interference cancellation with soft symbol estimation is performed after Alamouti demapping at the receiver side. When used in conjunction with the Alamouti-based mapping scheme according to the first aspect, iterative interference cancellation with soft symbol estimation may cancel the remaining FBMC-inherent interference and can be optionally performed together with channel forward error correction (FEC) decoding.

Exemplary embodiments of the first aspect provide an Alamouti-based mapping method. This method can be used for transmitting data in a real field orthogonal FBMC modulation system. According to this method, a coding group of N modulation symbols, where N=m×n is to be transmitted. A coding group is sometimes also referred to as a code block in the following. A first mapping of the coding group of N modulation symbols is generated in a time-frequency domain. Furthermore, an element-wise Alamouti mapping of the coding group of N modulation symbols is generated in the time-frequency domain. The Alamouti mapping of the coding group of N modulation symbols may be representable by a second matrix, wherein the second matrix of said element-wise Alamouti mapping has a first block and a second block. Each of the two blocks has N/2 modulation symbols and comprises a respective one of the two modulation symbols of each Alamouti pair. According to the Alamouti-based mapping method a pattern of the signs of the modulation symbols within the second block of the second matrix is opposite to the pattern of the signs of the modulation symbols within the first block of the second matrix. The N modulation symbols of said first mapping are transmitted via a first antenna, and the N modulation symbols of the element-wise Alamouti mapping are transmitted via another, second antenna.

In a further embodiment, the number of symbols N=m×n of the coding group is defined by the parameters n≥2+2k and m≥2, where k∈N (i.e. k is a natural number larger than zero). In this further embodiment, Alamouti mapping of the coding group of N modulation symbols is representable by the second matrix in which the elements of each row of the second matrix indicate n modulation symbols for transmission in respective time slots in the time domain, and the elements in each column of the second matrix indicate the m modulation symbols to be transmitted on respective subcarrier frequencies. The second matrix of said element-wise Alamouti mapping has a first block of N/2 modulation symbols corresponding to the modulation symbols in the $1^{st}$ to $(n/2)^{th}$ column and $1^{st}$ to $m^{th}$ row of the second matrix, and a second block of N/2 modulation symbols corresponding to the modulation symbols in the $(n/2+1)^{th}$ to $n^{th}$ column and $1^{st}$ to $m^{th}$ row of the second matrix. The first block and the second block of the second matrix comprise a respective one of the two modulation symbols of each Alamouti pair, and first block and the second block of the second matrix have opposite signs.

In a further optional improvement of this embodiment, the first mapping is representable by a first matrix in which the elements of each row of the first matrix indicate n modulation symbols for transmission in respective time slots in the time domain, and the elements in each column of the second matrix indicate the m modulation symbols to be transmitted on respective subcarrier frequencies. The first matrix of the first mapping has a first block of N/2 modulation symbols corresponding to the modulation symbols in the $1^{st}$ to $(n/2)^{th}$ column and $1^{st}$ to $m^{th}$ row of the first matrix, and a second block of N/2 modulation symbols corresponding to the modulation symbols in the $(n/2+1)^{th}$ to $n^{th}$ column and $1^{st}$ to $m^{th}$ row of the first matrix. The modulation symbols of the first block of the second matrix correspond to the modulation symbols of the second block of the first matrix and the modulation symbols of the second block of the second matrix correspond to the modulation symbols of the first block of the first matrix. Optionally, the first block and the second block of the first matrix comprise a respective one of the two modulation symbols of each Alamouti pair.

In a further improvement of this embodiment of the first aspect, a respective Alamouti pair of modulation symbols within the second matrix has a corresponding Alamouti pair of modulation symbols within the first matrix, and the respective two corresponding Alamouti pairs in the first matrix and second matrix form a respective Alamouti code. For each Alamouti code, one of the modulation symbols within the Alamouti pair in the second matrix has the opposite sign of the corresponding modulation symbol within the Alamouti pair in the first matrix, and the other one of the modulation symbols within the Alamouti pair in the second matrix has the same sign of the corresponding modulation symbol within the Alamouti pair in the first matrix.

In another embodiment of the Alamouti-based mapping method of the first aspect the modulation symbols of each Alamouti code have the same row indices and column indices in the first matrix and the second matrix.

In a further embodiment of the first aspect, the pattern of the signs of the modulation symbols within the first block of the second matrix is such that, for each modulation symbol in the first block of the second matrix, all neighbouring modulation symbols in column direction and row direction have opposite signs. This may be also described as a checkerboard pattern of the signs within the different blocks of the second matrix.

In another embodiment of the first aspect the pattern of the signs of the modulation symbols within the first block and the second block of the second matrix is such that in each of the first block and second block of the second matrix, the signs of each second row or column are inverted. For each row or column, respectively, the signs may be the same.

In a further embodiment of the first aspect the N/2 modulation symbols of the first block of said first matrix are transmitted within the same n/2 consecutive time slots as the N/2 modulation symbols of the first block said second matrix; and the N/2 modulation symbols of the second block said first matrix are transmitted within the same n/2 consecutive time slots as the N/2 modulation symbols of the second block said second matrix.

In an optional improvement of this embodiment, the N modulation symbols of said first matrix are transmitted on the same n consecutive time slots as the N modulation symbols of said second matrix.

In alternative optional improvement of this embodiment the n/2 consecutive time slots for transmitting the N/2 modulation symbols of the first block of said first matrix and said second matrix are spaced by at least one time slot from the n/2 consecutive time slots for transmitting the N/2 modulation symbols of the second block of said first matrix and said second matrix.

In another embodiment of the first aspect, the N modulation symbols of said first matrix are transmitted on the same m consecutive subcarrier frequencies as the N modulation symbols of said second matrix.

In a further embodiment of the first aspect, the N/2 modulation symbols of the first block of said first matrix and said second matrix are transmitted on m consecutive subcarrier frequencies that are spaced apart by at least one carrier frequency from the m consecutive subcarrier frequencies for transmitting the N/2 modulation symbols of the second block of said first matrix and said second matrix.

In another exemplary embodiment of the Alamouti-based mapping method of the first aspect, m≥2+2k and n≥2, where k∈N. In said second matrix representing the element-wise Alamouti mapping, the elements of each column of the second matrix indicate n modulation symbols for transmission in respective time slots in the time domain, and the elements in each row of the second matrix indicate the m modulation symbols to be transmitted on respective subcarrier frequencies. The second matrix of said element-wise Alamouti mapping has a first block of N/2 modulation symbols corresponding to the modulation symbols in the $1^{st}$ to $(m/2)^{th}$ row and $1^{st}$ to $n^{th}$ column of the second matrix, and a second block of N/2 modulation symbols corresponding to the modulation symbols in the $(m/2+1)^{th}$ to $m^{th}$ row and $1^{st}$ to $n^{th}$ column of the second matrix. The first block and the second block of the second matrix comprises a respective one of the two modulation symbols of each Alamouti pair, and the modulation symbols with identical row index and column index within the first block and the second block of the second matrix have opposite signs.

In an optional improvement of this embodiment, the first mapping can be represented by a first matrix in which the elements of each column of the first matrix indicate n modulation symbols for transmission in respective time slots in the time domain, and the elements in each row of the second matrix indicate the m modulation symbols to be transmitted on respective subcarrier frequencies. The first matrix of the first mapping has a first block of N/2 modulation symbols corresponding to the modulation symbols in the $1^{st}$ to $(m/2)^{th}$ row and $1^{st}$ to $n^{th}$ column of the first matrix, and a second block of N/2 modulation symbols corresponding to the modulation symbols in the $(m/2+1)^{th}$ to $m^{th}$ row and $1^{st}$ to $n^{th}$ column of the first matrix. The modulation symbols of the first block of the second matrix correspond to the modulation symbols of the second block of the first matrix and the modulation symbols of the second block of the second matrix corresponds to the modulation symbols of the first block of the first matrix.

In a further optional improvement of this embodiment, the first block and the second block of the first matrix comprises a respective one of the two modulation symbols of each Alamouti pair.

In yet another optional improvement of this embodiment, a respective Alamouti pair of modulation symbols within the second matrix has a corresponding Alamouti pair of modulation symbols within the first matrix, and the respective two corresponding Alamouti pairs in the first matrix and second matrix form a respective Alamouti code. For each Alamouti code, one of the modulation symbols within the Alamouti pair in the second matrix has the opposite sign of the corresponding modulation symbol within the Alamouti pair in the first matrix, and the other one of the modulation symbols within the Alamouti pair in the second matrix has the same sign of the corresponding modulation symbol within the Alamouti pair in the first matrix. Optionally, the modulation symbols of each Alamouti code have the same row indices and column indices in the first matrix and the second matrix.

In a further embodiment, the pattern of the signs of the modulation symbols within the first block of the second matrix is such that, for each modulation symbol in the first block of the second matrix, all neighboring modulation symbols in column direction and row direction have opposite signs.

In another embodiment of the first aspect the pattern of the signs of the modulation symbols within the first block and the second block of the second matrix is such that in each of the first block and second block of the second matrix, the signs of each second row or column are inverted. For each row or column, respectively, the signs may be the same.

In a further embodiment, the N/2 modulation symbols of the first block said first matrix are transmitted within the same m/2 consecutive subcarrier frequencies as the N/2 modulation symbols of the first block said second matrix. The N/2 modulation symbols of the second block said first matrix are transmitted within the same m/2 consecutive subcarrier frequencies as the N/2 modulation symbols of the second block said second matrix.

In an optional improvement of this embodiment, the N modulation symbols of said first matrix are transmitted on the same m consecutive subcarrier frequencies as the N modulation symbols of said second matrix.

In another optional improvement of this embodiment, the m/2 consecutive subcarrier frequencies for transmitting the N/2 modulation symbols of the first block of said first matrix and said second matrix are spaced by at least one carrier frequency from the m/2 consecutive subcarrier frequencies for transmitting the N/2 modulation symbols of the second block of said first matrix and said second matrix.

In another embodiment, the N modulation symbols of said first matrix are transmitted on the same n consecutive time slots as the N modulation symbols of said second matrix.

According to another embodiment, the N/2 modulation symbols of the first block of said first matrix and said second matrix are transmitted on n consecutive time slots that are spaced apart by at least one time slot from the n consecutive time slots for transmitting the N/2 modulation symbols of the second block of said first matrix and said second matrix.

Generally, in the embodiments of the first aspect, the N modulation symbols of said first mapping and the N modulation symbols of said element-wise Alamouti mapping are pulse-amplitude modulated (PAM) symbols, in particular offset quadrature amplitude modulation (OQAM) based symbols.

Generally, in the embodiments of the first aspect, the real field orthogonal FBMC modulation system is an OQAM/OFDM-based mobile communication system.

A further embodiment of the first aspect relates to device for transmitting data in a real field orthogonal FBMC modulation system. The device comprises a processing unit adapted to form a coding group of N modulation symbols, where N=m×n. The processing unit further generates a first mapping of the coding group of N modulation symbols in a time-frequency domain; and an element-wise Alamouti mapping of the coding group of N modulation symbols. Moreover, the device also comprises a transmitter unit to transmit the N modulation symbols of said first mapping via a first antenna, and to transmit the N modulation symbols of said element-wise Alamouti mapping via another, second antenna. In this embodiment, the Alamouti mapping of the coding group of N modulation symbols is representable by a second matrix, wherein the second matrix of said element-wise Alamouti mapping has a first block and a second block, each of the two blocks having N/2 modulation symbols and comprises a respective one of the two modulation symbols of each Alamouti pair; and a pattern of the signs of the modulation symbols within the second block of the second matrix is opposite to the pattern of the signs of the modulation symbols within the first block of the second matrix.

In a further embodiment, the device further comprises said first and second antenna.

Another embodiment relates to that is capable of performing the steps of the Alamouti-based mapping method of the first aspect according to one of its various embodiments described herein.

A further embodiment of the first aspect provides a computer-readable medium storing instructions that, when executed by a processor of a device, cause the device to transmit data in a real field orthogonal FBMC modulation system, by forming a coding group of N modulation symbols, where N=m×n; generating a first mapping of the coding group of N modulation symbols in a time-frequency domain; generating an element-wise Alamouti mapping of the coding group of N modulation symbols; and transmitting the N modulation symbols of said first mapping via a first antenna, and transmitting the N modulation symbols of said element-wise Alamouti mapping via another, second antenna. The Alamouti mapping of the coding group of N modulation symbols is representable by a second matrix, wherein the second matrix of the element-wise Alamouti mapping has a first block and a second block, each of the two blocks having N/2 modulation symbols and comprises a respective one of the two modulation symbols of each Alamouti pair. Further, the pattern of the signs of the modulation symbols within the second block of the second matrix is opposite to the pattern of the signs of the modulation symbols within the first block of the second matrix.

The computer-readable medium according to another embodiment further stores instructions that, when executed by the processor, cause the processor to perform the steps of the Alamouti-based mapping method of the first aspect according to one of the various embodiments described herein.

Another embodiment related to the second aspect of the disclosure provides a method for receiving data of a coding group transmitted in a real field orthogonal FBMC modulation system. The method comprises a receiving device receiving a transmission signal comprising the data of the coding group from a channel. The coding group may be transmitted according to the Alamouti-based mapping method of the first aspect according to one of the various embodiments described herein. Furthermore, an Alamouti demapping is performed based on the received transmission signal to reconstruct estimates of N modulation symbols of the coding group from the transmission signal. In an iterative process, interference within the estimates of N modulation symbols of the coding group is cancelled and the estimates of the N modulation symbols, in which interference has been cancelled by the iterative interference cancellation, is mapped to the data of the coding group.

In another embodiment, iteratively cancelling interference within the estimates of N modulation symbols of the coding group uses soft symbol estimates. In a further embodiment, the method comprises performing a soft decision on the transmitted modulation symbol value based on the estimates of N modulation symbols of the coding group to obtain the soft symbol estimates. Note that it is also possible to use symbol estimates that are determined based on a hard decision.

In an exemplary implementation of this embodiment, the residual interference for each modulation symbol is determined based on the soft symbol estimates, and the residual interference for each modulation symbol is cancelled within the estimates of N modulation symbols of the coding group.

According to another embodiment, performing an Alamouti demapping comprises maximum ratio combining of the symbols of the two Alamouti pairs of each Alamouti code within the received signal to reconstruct a respective pair of modulation symbols of the coding group.

Still in line with the second aspect, another embodiment relates to a receiver device for receiving data of a coding group transmitted in a real field orthogonal FBMC modulation system. The receiver device comprises a receiver block to receive a transmission signal comprising the data of the coding group transmitted by a transmitting device of claim 30 from a channel. Furthermore, the receiver device comprises an Alamouti demapping block configured to perform an Alamouti demapping based on the received transmission signal to reconstruct estimates of N modulation symbols of the coding group from the transmission signal. The receiver device also has an iterative interference cancellation block configured to cancel interference within the estimates of N modulation symbols of the coding group, and a processing unit configured to map the estimates of the N modulation symbols, in which interference has been cancelled by the iterative interference cancellation block, to the data of the code block.

The receiver device according to another embodiment may be configured, e.g. by using respective adapted means, to perform the steps of the method for receiving data of a coding group transmitted in a real field orthogonal FBMC modulation system according to one of the various embodiments of the second aspect discussed herein.

Another embodiment related to the second aspect of the disclosure provides a computer readable medium storing instructions that, when executed by a processor of a receiver device, cause the receiver device to receive data of a coding group transmitted in a real field orthogonal FBMC modulation system by receiving device receiving a transmission signal comprising the data of the coding group from a channel (the coding group may have been transmitted according to the Alamouti-based mapping method of the first aspect according to one of the various embodiments described herein); performing an Alamouti demapping based on the received transmission signal to reconstruct estimates of N modulation symbols of the coding group from the transmission signal; iteratively cancelling interference within the estimates of N modulation symbols of the coding group; and mapping estimates of the N modulation symbols, in which interference has been cancelled by the iterative interference cancellation, to the data of the coding group.

The computer-readable medium according to another embodiment further stores instructions that, when executed by a processor of a receiver device, cause the processor to perform the steps of the method for receiving data of a coding group transmitted in a real field orthogonal FBMC modulation system according to one of the various embodiments of the second aspect discussed herein.

BRIEF DESCRIPTION OF FIGURES

In the following embodiments of the disclosure are described in more detail in reference to the attached figures and drawings. Similar or corresponding details in the figures are marked with the same reference numerals.

DETAILED DESCRIPTION

Figure 1:
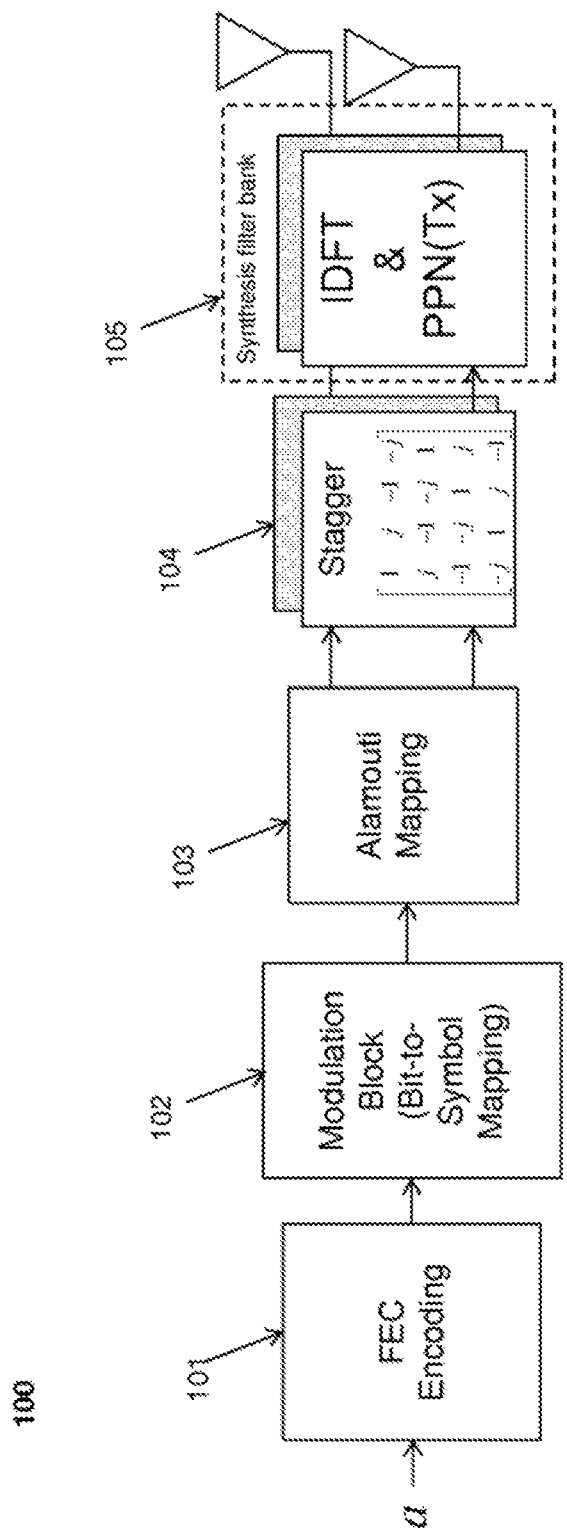
FIG. 1 shows an exemplary implementation of a transmitter structure according to an embodiment of the disclosure.

The following paragraphs will describe various embodiments of the different aspects. For exemplary purposes only, most of the embodiments are outlined in relation to an Alamouti-based mapping scheme for use with space-time block code (STBC), the disclosure can be also readily used together with space-frequency block code (SFBC). Further, it is exemplarily assumed that two transmit antennas are used at the transmitter side. However, the disclosure can be also applied with four (or more) transmit antennas; for example, by using switched transmit diversity (FSTD). Moreover, the disclosure may be readily implemented a FBMC system using IOTA and PHYDYAS prototype filters, but this should not be considered limiting the disclosure to such type of prototype filters. Notably, the principles of the disclosure are independent of filter types, and can be used in various kinds of systems.

As noted above, a first aspect of the disclosure relates to a new Alamouti-based mapping scheme for use in a real fields FBMC modulation system which can reduce FBMC-intrinsic interference and allows approaching optimal performance. The new coding scheme can implement a space-time or space-frequency block codes (STBC/SFBC) code. The coding scheme can be considered optimal, in the sense that the intrinsic interference after maximum ratio combining (MRC) at the receiver side can be minimized in comparison to any other element-wise Alamouti patterns. The proposed Alamouti mapping can be generalized in time as well as in frequency domain. Furthermore, it may be adapted to all types of prototype filters without modification. First aspect can be readily applied for MIMO channel transmission in downlink, but may also be used in uplink.

As regards the receiver side, the Alamouti-based mapping scheme of the first aspect can be readily used with conventional Alamouti demapping and decoding schemes known in the art. Although the Alamouti-based mapping scheme of the first aspect already allows reducing the FBMC inherent interference, a second aspect of the disclosure relates to a (further) improvement of the performance at the receiver side. This second aspect can be used in combination with a transmission system operating according to the first aspect. According to this second aspect, an iterative interference cancellation (IIC) scheme with soft symbol estimation (SSD) is introduced in the signal reconstruction path on the receiver side. Iterative interference cancellation with soft symbol estimation is performed after Alamouti demapping at the receiver side in order to (further) reduce the interference introduced by FBMC. When used in conjunction with the Alamouti-based mapping scheme according to the first aspect, iterative interference cancellation with soft symbol estimation may cancel the remaining FBMC-inherent interference and can be optionally performed together with channel forward error correction (FEC) decoding.

Generally, in this disclosure can be applied either at the transmitter side and/or on the receiver side of a real filed orthogonal FBMC communication system.

FIG. 1 illustrates an example of a proposed FBMC Alamouti transmitter structure 100. For illustration purposes only, PAM modulation is assumed in the transmitter structure. Note that the principles may however easily extended to complex symbols. A stream of payload bits a is input into FEC coding block 101. FEC coding block 101 performs FEC encoding of the payload bits and passes the FEC encoded bits to a modulation block 102 which maps the coded payload bits to PAM symbols. The modulation scheme may be for example an 8PAM, but also other PAM schemes may be used. It is also possible to use QAM modulation, e.g. 16QAM, 64 QAM, etc. This mapping may be block-wise, e.g. for each transport block of encoded payload bits.

The mapping may optionally include the mapping of reference symbols, pilots and/or other control information that needs to be transmitted together with a block of encoded payload bits. Alternatively reference symbols, pilots and/or other control information that needs to be transmitted together with a block of encoded payload bits may be inserted after Alamouti mapping, e.g. to replace payload symbols (or alternatively, no Alamouti mapping is used for symbols where reference symbols, pilots and/or other control information that needs to be transmitted together with a block of encoded payload bits are to be inserted into the time-frequency grid).

Note that the block of encoded payload bits may also be referred to as a code block (or coding group). Without losing generality, it can be assumed to comprise N modulation symbols. Modulation block 102 maps modulation symbols of the code block to a time-frequency resource grid according to the frame structure. The time-frequency resource grid can be represented by means of two-dimensional matrix, one dimension extending in the time domain, the other dimension extending in the frequency domain. In the time domain, the resources may be represented by time-slots. In the frequency domain, the resources may be represented by individual subcarrier frequencies or sub-bands of the spectrum. The time-frequency resource grid may represented by a matrix may thus define the mapping of the modulation symbols generated by modulation block 102 onto timeslots and subcarrier frequencies (or sub-bands) in the time frequency domain.

In a more mathematical way of expressing this, a code block of N modulation symbols may be represented by a matrix of dimension m×n, where N=m×n and n and m being natural numbers (n, m∈N ). Advantageously, N is an even number. For example, the elements of each row of the matrix indicate n modulation symbols for transmission in respective time slots in the time domain, and the elements in each column of the matrix indicate the m modulation symbols to be transmitted on respective subcarrier frequencies. In case of forming a STBC by means of Alamouti mapping discussed herein, n≥2+2k and m≥2, where k∈N may hold true. In case of forming a SFBC by means of the Alamouti mapping discussed herein, m≥2+2k and n≥2, where k∈ N may hold true. However, the principles of the proposed Alamouti mapping can also be used for n=m=2.

The modulated symbols of modulation block 102 are then passed to the Alamouti mapping block 103. Alamouti mapping block 103 can be considered to form a STBC/SFBC pattern and based on the modulated code block by generating two transmissions of the code block. These two transmissions of the code block may be transmitted via distinct antennas. In brief, Alamouti mapping block 103 generates a second mapping (Alamouti mapping) from the symbol mapping (first mapping) of modulation block 102, so two code blocks of N modulation symbols, one according to the first mapping of modulation block 102 and the other one according to the Alamouti mapping of Alamouti mapping block 103 are provided to stagger block 104.

Note that in this document and as in the conventional terminology used in connection with state-of-the-art Alamouti mapping, the pair modulation symbols of the second mapping (Alamouti mapping) is referred to as an Alamouti pair (of the Alamouti mapping). The corresponding pair of modulation symbols within the first mapping is also referred to as an Alamouti pair (of the first mapping), and the corresponding two Alamouti pairs of the first and second mapping form an Alamouti code. The transmission of an Alamouti codes thus transmits two modulation symbols of the code block in two transmissions.

Stagger block 104 can be considered to add a phase term to each PAM symbol of the two code blocks provided by Alamouti mapping block 103. Stagger block 104 (together with the corresponding de-stagger block 702 in the receiver structure 700) is aimed to construct complex symbols at the transmitter side and reconstruct them to recover real symbols at the receiver side, respectively. It should be noted that the staggering/de-staggering process does not affect the proposed Alamouti mapping scheme, since the impulse response of stagger block 103 and its counterpart on the receiver side is "1" in time-frequency structure.

Stagger block 104 outputs the PAM symbols (now with phase component) corresponding to the two-code blocks the synthesis filter bank 105. Synthesis filter bank 105 modulates and filters the FBMC signal and transforming the signal into time domain. The filter bank 105 can be considered to be a conventional IDFT/PPN component. Synthesis filter bank 105 ensures that the modulation symbols corresponding to the code block according to the first mapping by modulation block 102 and according to the second mapping by Alamouti mapping block 104 are mapped to different antennas for transmission.

Note that in the example above, we have assumed the PAM symbols to be real values, and that stagger block 104 adds a phase component (by transforming one of the two symbols of an Alamouti pair into the complex domain). Apparently this is only a specific representation of the modulation symbols in the context of the proposed Alamouti mapping. When deciding which of the two symbols within a code block are to form an Alamouti pair, one could also consider the one symbol to indicate the real part and the other symbol to indicate the complex part of a complex symbol, i.e. an Alamouti pair could also be viewed as one complex symbol.

Figure 2:
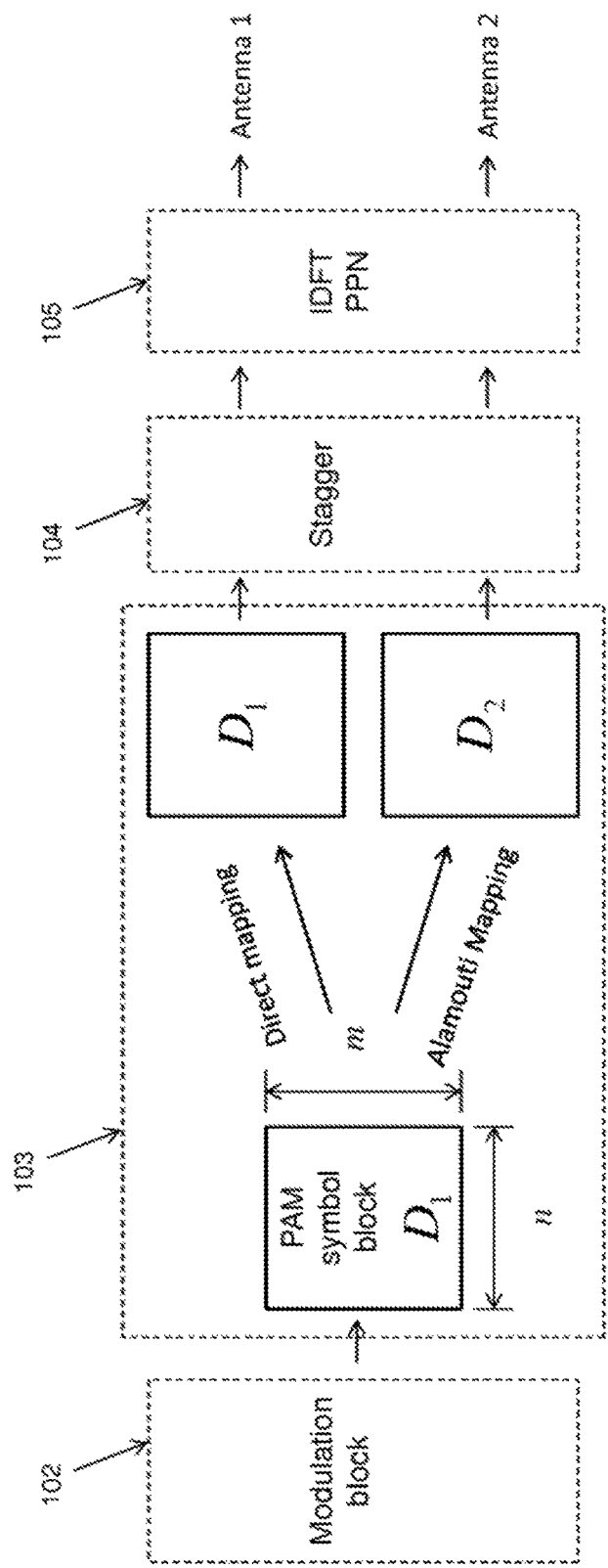
FIG. 2 shows an exemplary implementation of an Alamouti mapping block 304 according to an embodiment of the disclosure.

An example of an Alamouti mapping block 102 is shown in FIG. 2. The Alamouti mapping block 102 performs generating two data frames based on the proposed Alamouti mapping.

A conventional element-wise Alamouti mapping can be simplified by considering as a two-steps operation: For each Alamouti pair of symbols, symbol positions are exchanged and assigning a minus sign to one the two symbols (i.e. inverting the value of one of the symbols). In the Alamouti mapping scheme discussed herein a specific pattern for changing the symbols' positions and for assigning minus signs to one of the symbols of each Alamouti pair is suggested. The proposed patterns allow reducing the FBMC intrinsic interference. Each of the patterns suggested herein can be using in conjunction with prototype filters for interference cancellation.

As shown in FIG. 2, the N modulation symbols of a code block generated by modulation block 303 are shown as a time-frequency structured data block $D_1$ (which can be considered a matrix in a time-frequency grid). The Alamouti mapping of the N modulation symbols of the code block generated by Alamouti mapping block 103 are shown as a time-frequency structured data block $D_2$ (which can be considered a matrix in a time-frequency grid). The two time-frequency structured data block $D_1$ and $D_2$ are transmitted via two distinct antennas, denoted "Antenna 1" and "Antenna 2" respectively. For exemplary purposed only, we assume that the symbols are real PAM modulated symbols. For each symbol $d_{i,j}$, i denotes subcarrier index and j denotes time index, wherein i∈{1, . . . , m} and j∈{1, . . . , n}. The Alamouti mapping of Alamouti mapping block 103 can be considered a space time code pattern or space frequency code pattern, which is generated based on the (first) mapping of the N modulation symbols of the code block generated by modulation block 102 (shown as the time-frequency structured data block $D_1$).

In one example, the Alamouti mapping by Alamouti mapping block 103 forms and space time block code (STBC) that is obtained from the first mapping by modulation block 102 as follows. As noted before, the first mapping of the code block by modulation block 102 yields a time-frequency grid of N modulation symbols that can be represented by a two-dimensional matrix of dimension m×n. The two-dimensional matrix of dimension m×n is considered to contain two same sized data blocks (first data block and second data block). For generating a STBC, each data block contains $$N' = \frac{N}{2} = m \cdot (n/2)$$

symbols, i.e. the first data block contains the symbols $d_{i,j}$, with arbitrary i and $$j \in \left\{1, \ldots, \frac{n}{2}\right\},$$

while the second data block contains the symbols $d_{i,j}$, with arbitrary i and $$j \in \left\{\frac{n}{2}+1, \ldots, n\right\}.$$

These two data blocks are extracted from the first mapping which is going to be transmitted as a first data frame through a first antenna and the position of the two data blocks are exchanged (in time order) in the Alamouti mapping for transmitting them as another data frame through a different, second antenna.

The relative position of each symbol (in terms of its column index and row index) within each data block in the second data frame remains unchanged in comparison with the first data frame. Each two symbols having the same column index and row index within the first data block and the second data block from an Alamouti pair. A minus sign is assigned to one of the symbols of each Alamouti pair by the Alamouti mapping block 304 in such a way that one and only one symbol of each Alamouti pair is assigned the minus sign (i.e. turned into its opposite value—the value v becomes—v). Therefore, in the Alamouti mapping $D_2$, $$N' = \frac{N}{2}$$

symbols of the N symbols of the code block are assigned the minus sign (denoted also as "sign rotation"). Furthermore, the symbols with the same row index and column index within the first data block and second data block within the second mapping $D_2$ mutually have opposite sign assignment. Hence, in case symbol $d_{i,j}$ in the first data block is not assigned a minus sign, the corresponding symbol $d_{i,j}$ in the second data block is assigned a minus sign (or vice versa). Note that here i and j are relative to the respective data block.

For the STBC case, m can be considered to represent the number of consecutive subcarriers to which the respective code block symbols are mapped. In the time domain, each data block may span n/2 consecutive time slots. The value of n depends on the time span (number of consecutive time slots) in which a coherent channel can be assumed to be present. Note that the symbols of the two data blocks of the first mapping $D_1$ and Alamouti mapping $D_2$ may be mapped to the same set of time slots, but this is not mandatory.

The time slots to which the symbols of the two data blocks of the first mapping $D_1$ and Alamouti mapping $D_2$ are mapped for transmission are advantageously non-overlapping. The subcarriers to which the symbols of the two data blocks of the first mapping $D_1$ and Alamouti mapping $D_2$ are mapped for transmission may either overlap or not.

Note that a space frequency block code can be generated in a similar fashion, i.e. by exchanging the mapping to time slots with a mapping to subcarriers, and exchanging the mapping to subcarriers with a mapping to time slots in the above STBC example. In the SFBC case, the symbols of the two data blocks of the first mapping $D_1$ and Alamouti mapping $D_2$ may thus be mapped to respective (and non-overlapping) n/2 consecutive subcarriers for transmission. Note that the symbols of the two data blocks of the first mapping $D_1$ and Alamouti mapping $D_2$ may be mapped to the same set of subcarrier frequencies, but this is not mandatory. For SFBC, in one example, the subcarriers spanned by the two data blocks do not overlap, while the time slots occupied by the two data blocks can either overlap or not.

Figure 3:
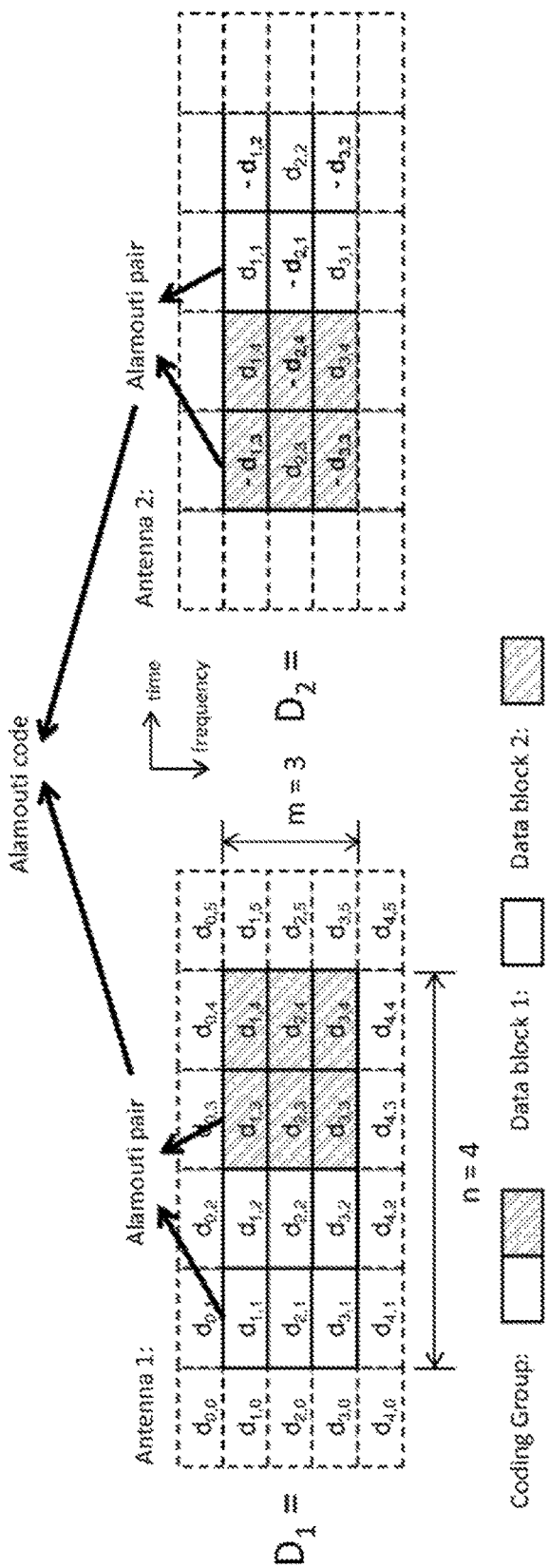
FIG. 3 shows an exemplary Alamouti mapping generated from a first mapping assuming a code block size of N=3×4.

FIG. 3 shows an exemplary Alamouti mapping generated from a first mapping assuming a code block size of N=3×4. The first mapping $D_1$ and Alamouti mapping $D_2$ are shown on the left and right side of this figure, respectively. The coding group/code block has N=12 symbols, wherein in each of the two mappings, the symbols are denoted $d_{i,j}$, where i denotes subcarrier index and j denotes time index, and where i∈{1, 2, 3} and j∈{1, 2, 3, 4}. In each mapping, the symbols $d_{i,j}$ and $$d_{i+\frac{n}{2},j} = d_{i+2,j}$$

for respective Alamouti pairs. The symbols $d_{i,j}$ and $$d_{i+\frac{n}{2},j}$$

in both mappings from Alamouti code. The first data block comprises the elements $d_{i,j}$, where i∈{1, 2, 3} and j∈{1, 2} and the first data block comprises the elements $d_{i,j}$, where i∈{1, 2, 3} and j∈{3, 4}. In the Alamouti mapping $D_2$ the first data block and the second data block are exchanged in order in the time domain in comparison to the first mapping $D_1$. Furthermore, in the Alamouti mapping $D_2$ one of the symbols of each Alamouti pair is assigned a minus sign. As can be seen in FIG. 3 the minus signs are assigned to the symbols of the Alamouti mapping $D_2$ such that there is a checkerboard pattern in each of the blocks and the checkerboard pattern in the second data block is opposite to the checkerboard pattern in the first data block as regards the assignment of the minus sign. Another way to express this checkerboard pattern is that all direct neighbors (i.e. the neighboring elements in column direction and row direction) of each element $d_{i,j}$ within the first data block have an inverted sign. This also holds true for the second data block.

In the following, further sign rotation patterns (in addition to the checkerboard pattern discussed in connection with FIG. 3) are presented in connection with FIGS. 4 to 6. Note that for all types of sign rotation, the two data blocks in the Alamouti mapping $D_2$ have opposite sign assignment. For better illustration, FIGS. 4, 5 and 6 exemplify an exemplary Alamouti mapping generated from a first mapping assuming a code block size of N=4×8.

Figure 4:
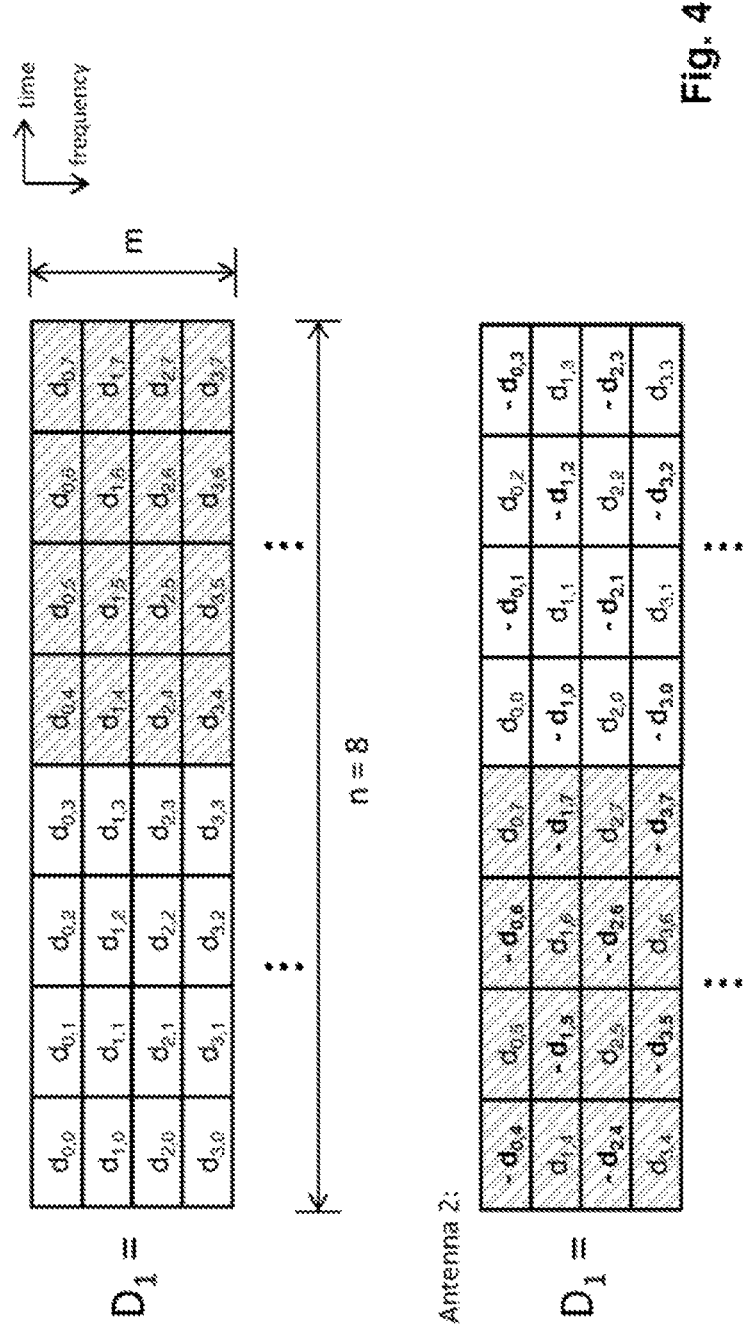
FIGS. 4 to 6 show further exemplary Alamouti mappings generated from a first mapping assuming a code block size of N=4×8.

FIG. 4 shows another checkerboard sign rotation pattern. Therefore, reference is made to the explanations of FIG. 3, which can be readily extended to the enlarged dimensions of the mappings. As noted before, in this checkerboard mapping, for each data block in the Alamouti mapping $D_2$, all neighboring symbols in column direction and row direction have different sign assignment.

Figure 5:
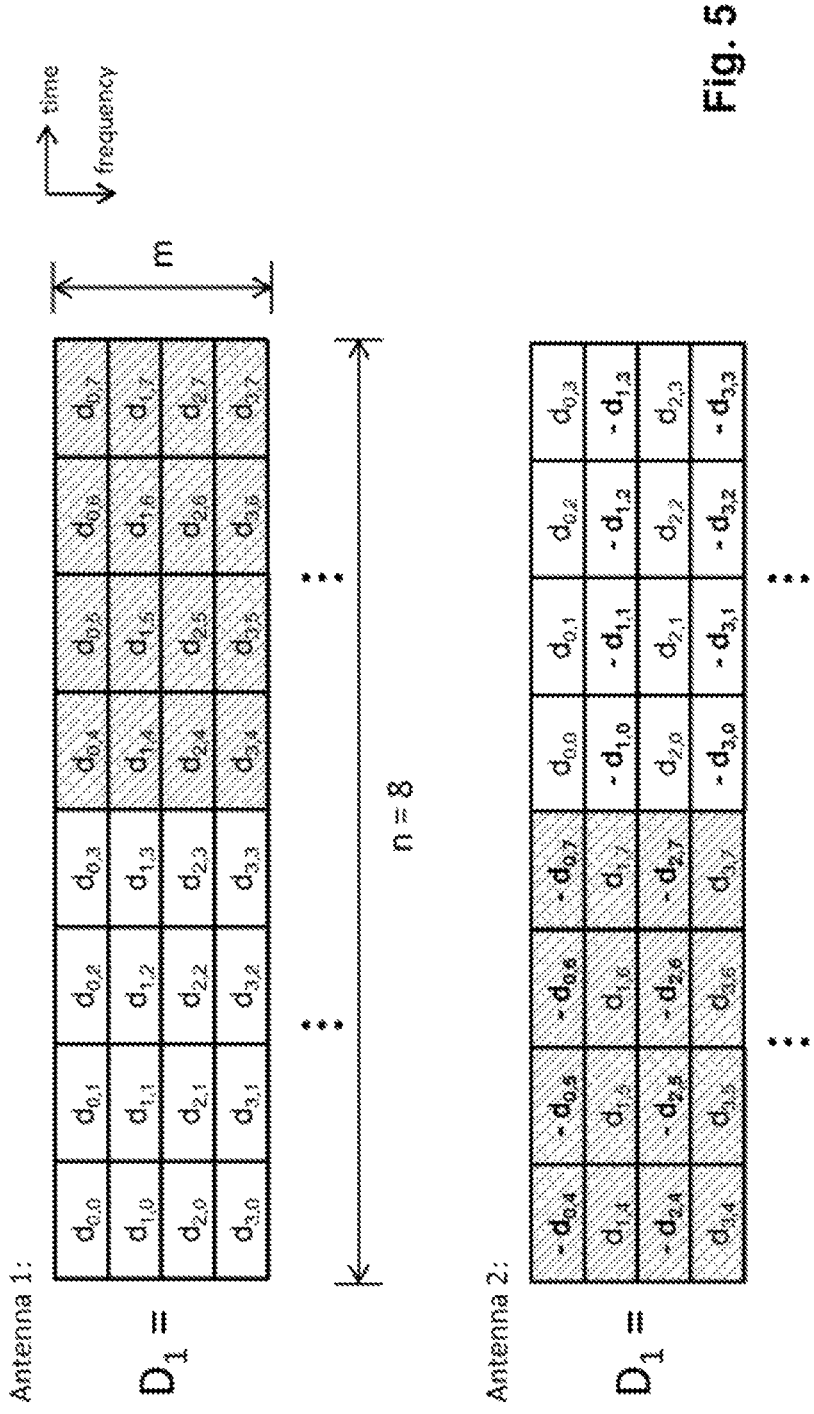

FIG. 5 shows another exemplary sign rotation pattern that can be used for the Alamouti mapping $D_2$. For each data block in the Alamouti mapping $D_2$, all neighboring symbols in column direction have different sign assignment while in row direction have same sign assignment.

Figure 6:
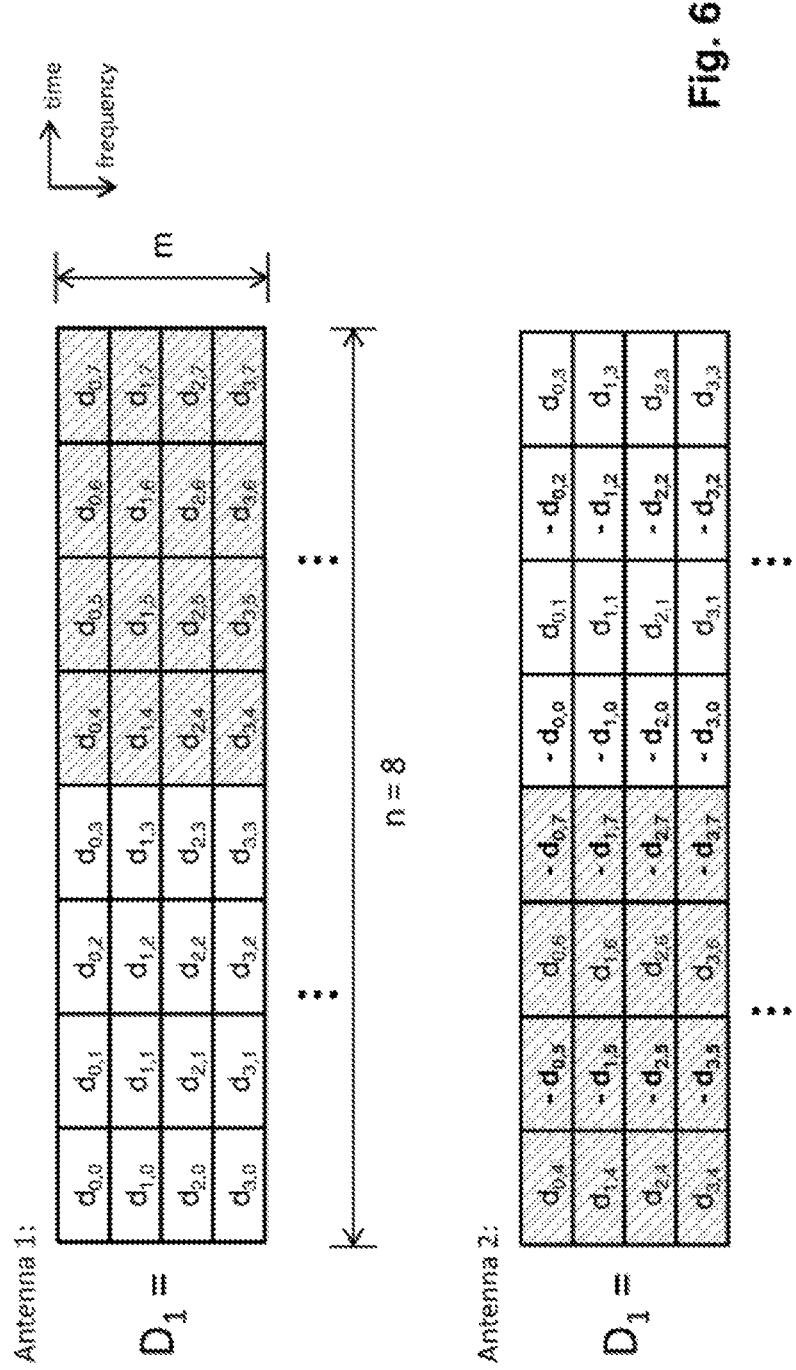

FIG. 6 shows a further exemplary sign rotation pattern that can be used for the Alamouti mapping $D_2$. For each data block in the Alamouti mapping $D_2$, all neighboring symbols in row direction have different sign assignment while in column direction have same sign assignment.

As noted above, the proposed Alamouti-based mapping scheme is not limited to real valued symbols. For example, four real symbols in code block can be treated as two complex symbols. For example, in the time or alternatively in the frequency domain, odd indexed symbols could be treated as the real part and even indexed symbols as the imaginary part of the complex symbols, or vice versa.

Figure 7:
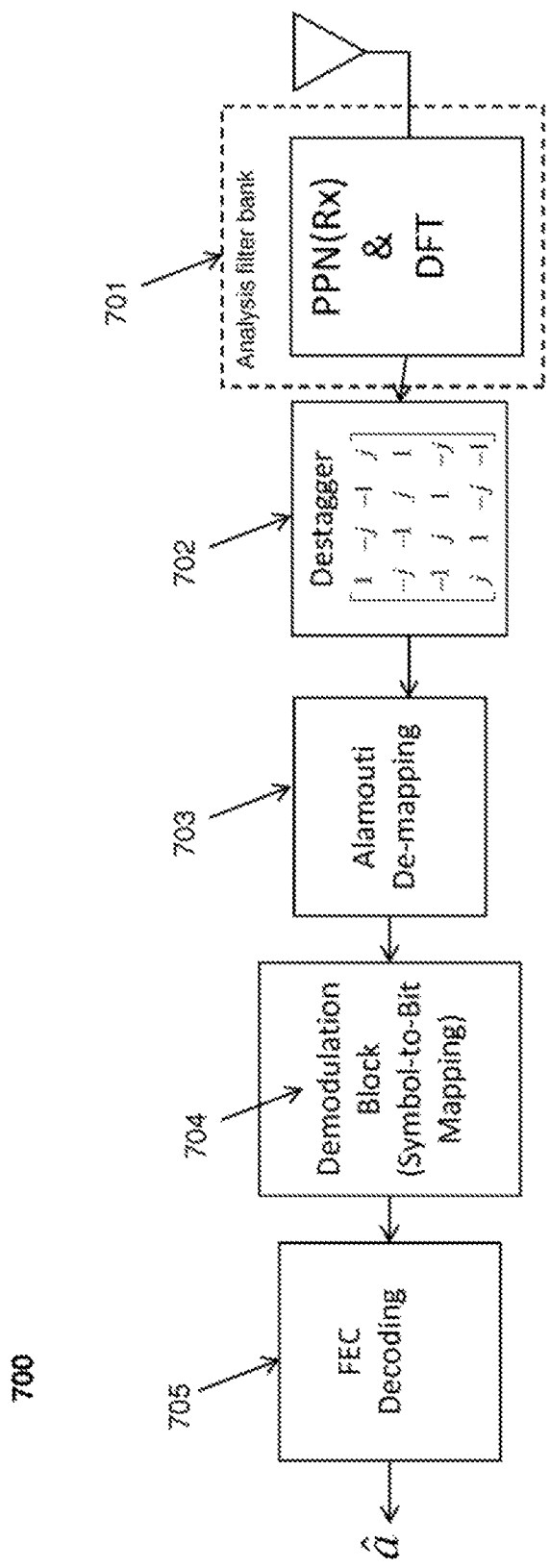
FIG. 7 shows an exemplary implementation of a receiver structure according to an embodiment of the disclosure.
Figure 8:
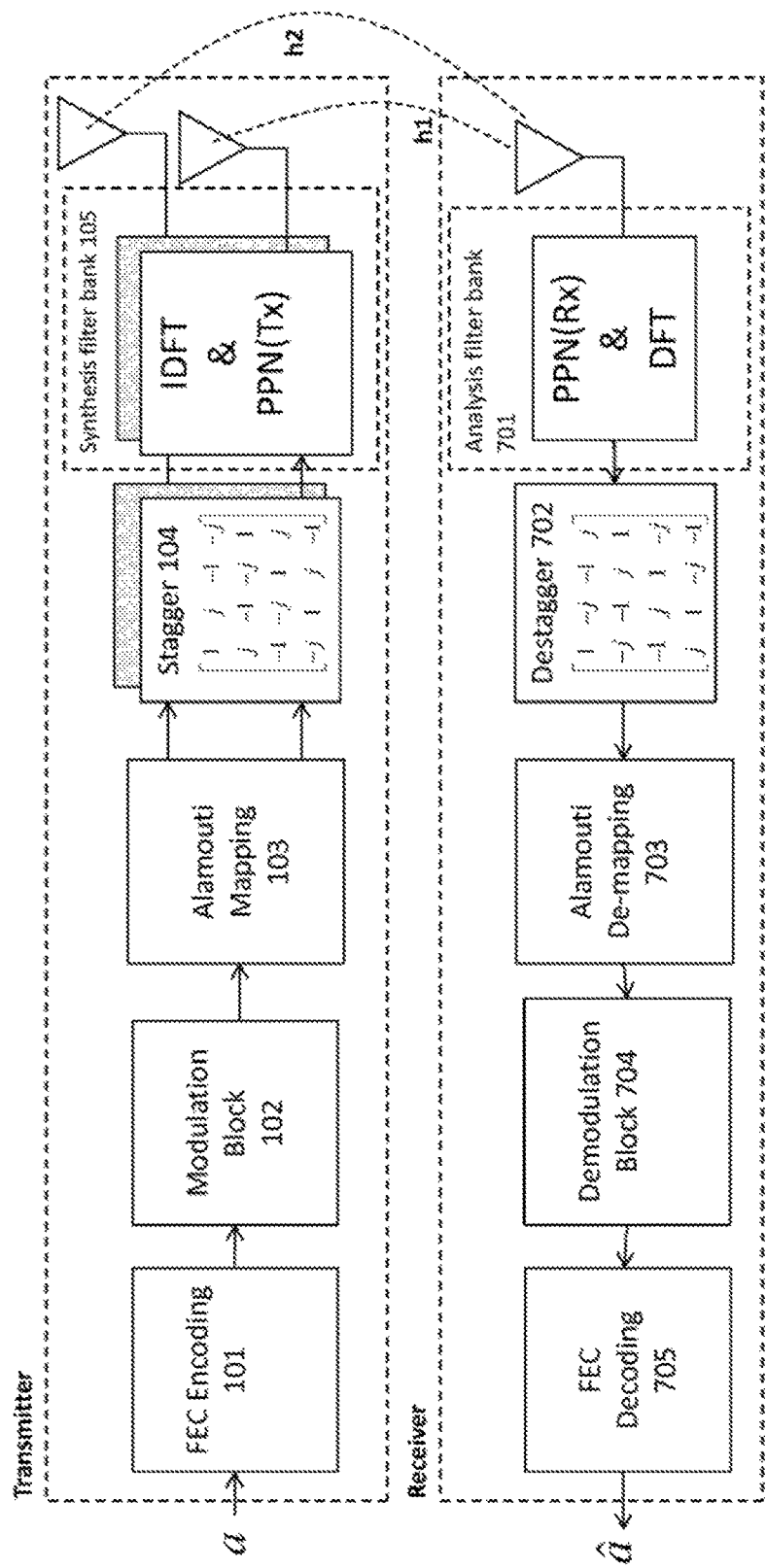
FIG. 8 illustrates an exemplary interrelation of the receiver structure of FIG. 7 and the transmitter structure of FIG. 1 according to an embodiment of the disclosure.

Next, the second aspect will be discussed in further detail. FIG. 7 shows an exemplary implementation of a receiver structure in line with the second aspect. FIG. 8 illustrates an exemplary interrelation of the receiver structure of FIG. 7 and the transmitter structure of FIG. 1 according to an embodiment of the disclosure.

The receiver structure 700 comprises an analysis filter bank 701, which essentially undoes the steps of synthesis filter bank 105 on the transmitter side. Analysis filter bank 701 thus performs de-modulating and matched filtering the FBMC signals at the receiver side and transforming the signal into frequency domain for each subcarrier by means of a discrete Fourier transformation (DFT). Note that the PPN/DFT component may be a conventional component. The de-stagger block 702 is the counterpart to stagger block 104 on the transmitter side. As noted above, this de-stagger 702 recovers real valued symbols from the respective subcarrier signals.

Alamouti demapping block 703 performs Alamouti demapping and combing as well as interference cancellation. As will be discussed below in connection with FIG. 10, an iterative interference cancellation (IIC) may be applied after symbol recovery by Alamouti combining. Note that the use of an IIC block is optional. The IIC is also referred to as the "inner loop" of the Alamouti demapping block 703.

The demodulation block 704 is configured for de-mapping the symbols in the time-frequency resource grid back to the coding blocks (which may be equivalent to transport blocks). The payload symbols of the code blocks are de-modulated back into bits and are decoded by the FEC decode 705 to recover the data. Blocks 704 and 705 thus perform the inverse operation of blocks 102 and 101 in FIG. 1.

Figure 9:
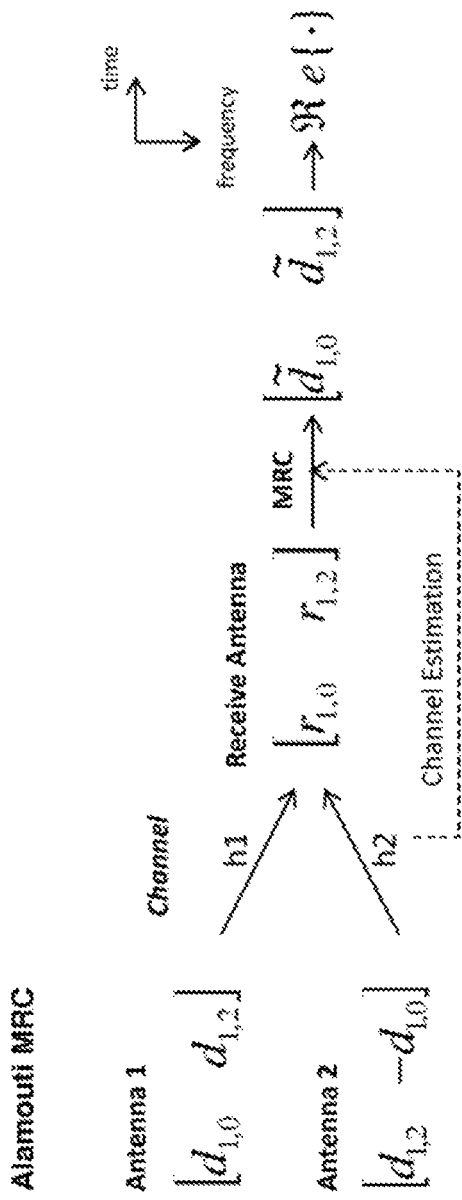
FIG. 9 summarized an exemplary Alamouti demapping and combining (MRC) process.
Figure 10:
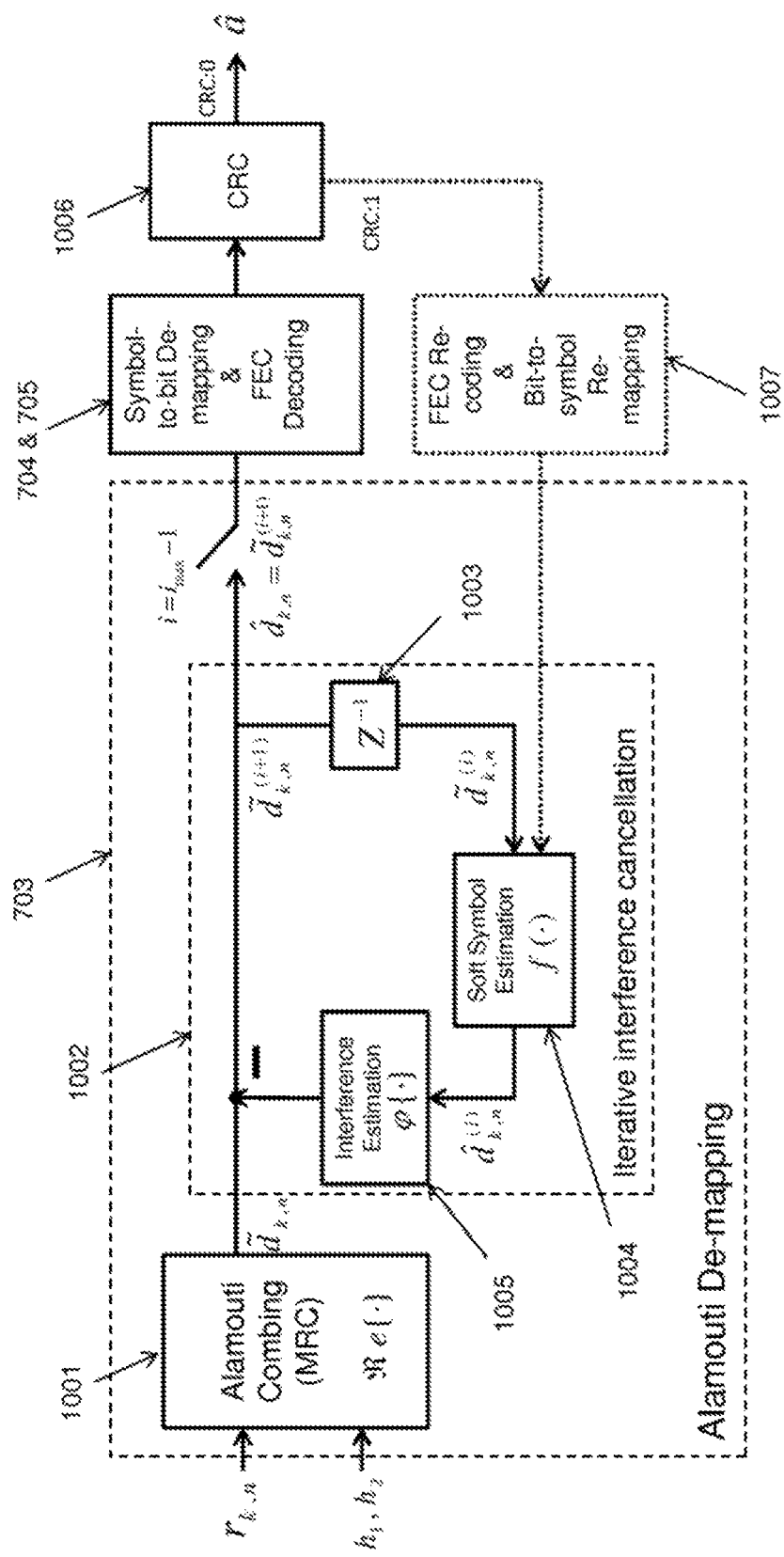
FIG. 10 shows an exemplary structure of an Alamouti de-mapping block 703 of FIG. 7.

The operation of the Alamouti de-mapping block 703 will be exemplified under reference to FIGS. 9 and 10 in further detail under consideration of an Alamouti-based mapping scheme as shown in FIG. 3. FIG. 10 shows an exemplary structure of the Alamouti demapping block 703. Alamouti demapping block 703 comprises an Alamouti combing (MRC) block 1001 and an iterative interference cancellation (IIC) block 1002. The Alamouti combing (MRC) block 1001 performs a conventional Alamouti decoding scheme (e.g. using maximum ratio combining) based on received signals (in units corresponding to a data frame) and channel estimations (channel coefficients)—see FIGS. 8 and 9. $h_1$ and $h_2$ denote the channel coefficients and the received signal is denoted by $r_{n,k}$, with subcarrier k and time slot index n. In case we assumed the modulation symbols to be PAM symbols, all the symbols should be real, so that imaginary interference should be eliminated. Then, take $d_{1,0}$ and $d_{1,2}$ as an example which are transmitted in the way as depicted in FIG. 3. The recovered estimates of the symbols $\tilde{d}_{1,0}$ and $\tilde{d}_{1,2}$ at the receiver side can be expressed by:

$$\tilde{d}_{1,0} = h_1^* r_{1,0} + h_2 r_{1,2}^*$$

$$\tilde{d}_{1,2} = h_2^* r_{1,0} - h_1 r_{1,2}^*. \quad (12)$$

The Alamouti combining process of the Alamouti combining (MRC) block 1001 is summarized in FIG. 9. After choosing the real part of the combined signal, the following estimates of the modulation symbols are obtained:

$$\tilde{d}_{1,0} = (|h_1|^2 + |h_2|^2)d_{1,0} + \mathrm{Re}\{h_1^* h_2 I_{1,0}\} + \mathrm{Re}\{h_1^* n_{1,0} - h_2 n_{1,2}^*\} \quad (13)$$

$$\tilde{d}_{1,2} = (|h_1|^2 + |h_2|^2)d_{1,2} + \mathrm{Re}\{h_1^* h_2 I_{1,2}\} + \mathrm{Re}\{h_1^* n_{1,2} - h_2 n_{1,0}^*\}$$

where $I_{1,0}$ and $I_{1,2}$ are the imaginary interference term. In case the channel coefficients are complex, intrinsic interference will partly remain after choosing the real part of the combing results (denoted as "residual interference") for the two symbol estimates. Note that by applying an Alamouti-based mapping scheme according to the first aspect discussed herein, the average power of residual interference can be minimized, so that only the residual interference remains.

For cancelling the residual interference, Alamouti demapping block 704 is configured to perform an iterative interference cancellation (IIC) scheme. This is illustrated by IIC block 1002 in FIG. 10, which comprises a storage element (delay element) 1003, as soft symbol estimation block 1004, and an interference estimation block 1005. The whole iteration process can be summarizes as follows:

$$\tilde{d}_{k,n}^{(i+1)} = \tilde{d}_{k,n} - \varphi\{f(\tilde{d}_{k,n}^{(i)})\} \quad (14)$$

where $\tilde{d}_{k,n}^{(1)} = \tilde{d}_{k,n}$, and $\varphi\{f(\tilde{d}_{k,n}^{(i)})\}$ denotes the residual interference estimate of the interference estimation block 1005 and $f(\tilde{d}_{k,n}^{(i)}) = \hat{d}_{k,n}^{(i)}$ denotes the soft symbol estimate of soft symbol estimation block 1004.

The output of Alamouti MRC $\tilde{d}_{k,n}$ is stored in storage element (delay element) 1003 and is fed back soft symbol estimation block 1004 where a soft decision on the transmitted symbol value is performed.

The soft decision function is optimized based on the criteria of minimizing the mean square error of symbol estimation. For bipolar transmission scheme (PAM modulation) with modulation index M, the corresponding optimal estimation can be expressed as follows:

$$\hat{d}_{k,n}^{(i)} = f(\tilde{d}_{k,n}^{(i)}) = \sum_{i=1-\frac{M}{2}}^{\frac{M}{2}-1} \tanh\{c \times (\tilde{d}_{k,n}^{(i)} - 2i)\} \quad (14)$$

After soft symbol estimation in block 10004, interference estimation (IE) is performed in block 1005. Interference estimation block 1005 estimates the residual interference for each symbol. The residual interference may be calculated based on how to account for the interference source(s). One can for example assume that all interference comes from eight nearest symbols of the currently decoded symbol, so that interference estimation may consider the influence of the eight nearest symbols in the time-frequency grid. Of course, a larger range of interference sources may be taken into consideration and their consideration follows the same interference cancellation rule as for the "eight nearest symbol" case, which will be explained in connection with FIG. 11 below.

Figure 11:
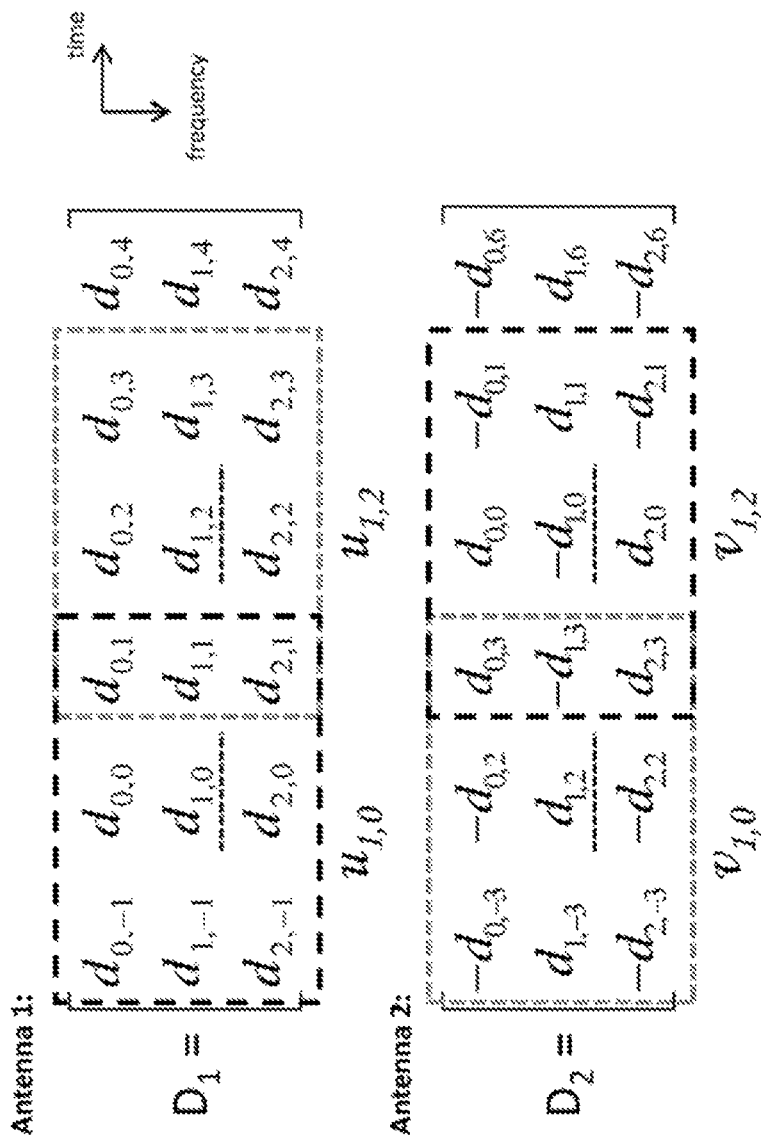
FIG. 11 illustrates the interference sources for symbols $d_{1,0}$ and $d_{1,2}$ of an Alamouti pair, considering the eight nearest neighbors.

Assuming that symbols $d_{1,0}$, $d_{1,2}$ are transmitted as shown FIG. 3, the imaginary interference term for these two symbols can be interpreted as after power normalization:

$$\varphi_{1,0}(\hat{d}_{k,n}^{(i)}) = \frac{1}{|h_1|^2 + |h_2|^2} \Re e\{h_1^* h_2 I_{1,0}\} \quad (15)$$

$$\varphi_{1,2}(\hat{d}_{k,n}^{(i)}) = \frac{1}{|h_1|^2 + |h_2|^2} \Re e\{h_1^* h_2 I_{1,2}\}$$

where $l_{1,0} = v_1 - u_2^*$ and $l_{1,2} = v_2 + u_1^*$, $u_{1,2}$, $v_{1,0}$ and $v_{1,2}$ stand for the intrinsic interference caused by surrounding symbols to symbol $d_{1,0}$, $d_{1,2}$ in block $D_1$ and $d_{1,2}$, $-d_{1,0}$ in block $D_2$, respectively, as shown in FIG. 11.

Interference estimation (IE) for symbols $d_{1,1}$, $d_{1,3}$ follows the same scheme. The estimated interference is subtracted from Alamouti combining result $\tilde{d}_{k,n}$ and the corresponding updated result will be fed into iteration loop again. After several loops the iteration process stops and the final data is fed into de-modulation component 704.

In an improvement of this example of iterative interference cancellation, the code block (e.g. transport block) which was decoded unsuccessfully with CRC check (cyclic redundancy check) after FEC decoding can be fed back again into the "inner loop" after re-coding and re-mapping as illustrated by the CRC block 1006 and the FEC re-coding and Bit-to-Symbol Remapping block 1007. Since some errors can be corrected through FEC decoding process, the "inner loop" will output a better symbol estimation. This process is may be denoted an "outer loop", and is optional.

Figure 12:
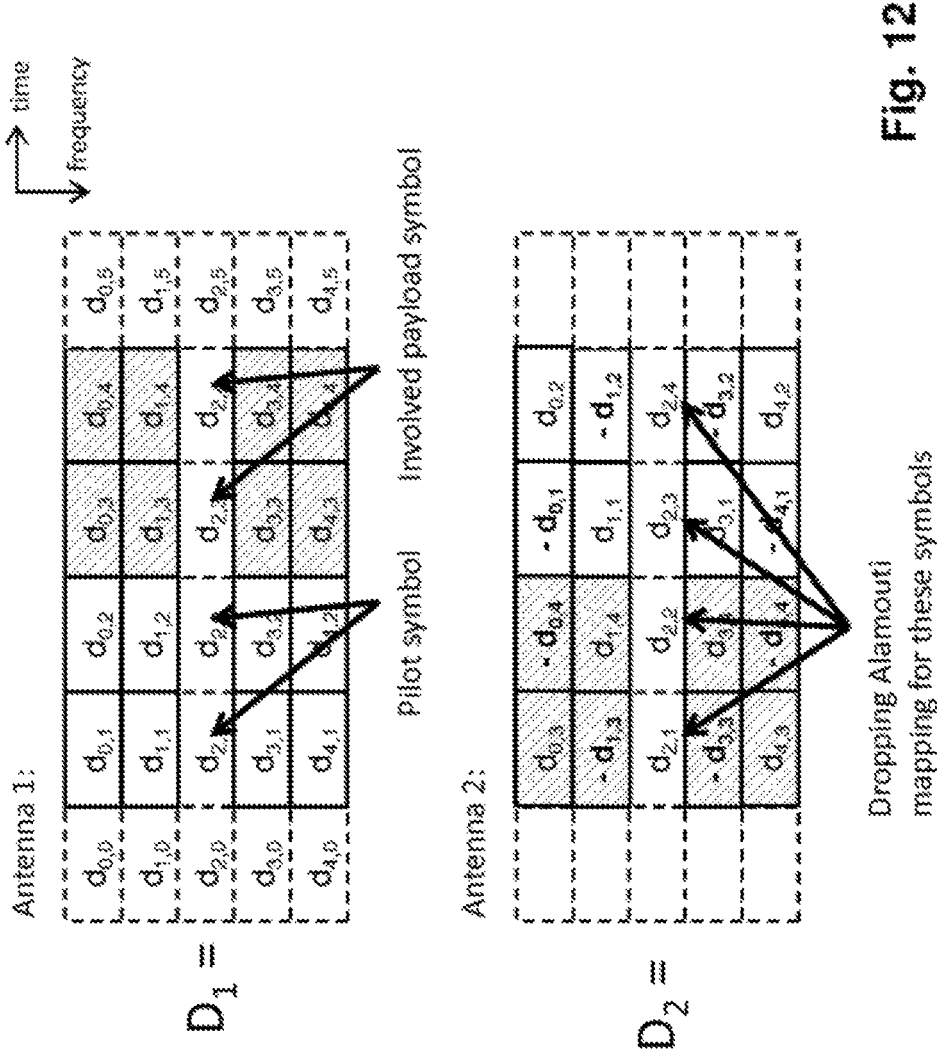
FIG. 12 shows an example of an improved Alamouti-based mapping scheme of the first aspect in case of transmitting coded reference symbols within the time-frequency frame structure.

It is to be noted that the proposed Alamouti-based mapping according to the first aspect can flexibly adapt to any designed time-frequency frame structure and coexist with non-Alamouti coded reference symbols within the time-frequency frame structure. For example, in case such coded reference symbols (or any other control information) are to be transmitted at given positions within the time-frequency grid of one of the first mapping $D_1$ or Alamouti mapping $D_2$, the proposed Alamouti-based mapping of the first aspect may not be applied to those symbols that would belong to the Alamouti code. This is illustrated for example in FIG. 12, where we assume a code block size of m×4 and STFC and that the pilot symbols should be transmitted on symbols $d_{2,1}$ and $d_{2,2}$. When applying the Alamouti-based mapping scheme of the first aspect (for n=4), the second symbol of the Alamouti pair of symbol $d_{2,1}$ would be $d_{2,3}$ and the second symbol of the Alamouti pair of symbol $d_{2,2}$ would be $d_{2,4}$ (see FIG. 3). Hence, when the pilot symbols are to be transmitted on symbols $d_{2,1}$ and $d_{2,2}$, symbols $d_{2,3}$ and $d_{2,4}$ are transmitted as defined in by the first mapping (all other symbols of the code block are also transmitted according to the first mapping). In the second mapping (Alamouti mapping) all symbols other than $d_{2,1}$, $d_{2,2}$, $d_{2,3}$ and $d_{2,4}$ are transmitted according to the propose Alamouti mapping, while no Alamouti mapping is performed for symbols $d_{2,1}$, $d_{2,2}$, $d_{2,3}$ and $d_{2,4}$. They may be transmitted in the same order as in the first mapping as indicated in FIG. 12.

In the previous examples, the two transmissions of the code block symbols of the first mapping and Alamouti mapping have been mapped to the same set of resources in the time-frequency grid when being transmitted via the first and second antenna respectively. As shown in FIGS. 3 to 6, the N/2 modulation symbols of the first data block of the first mapping $D_1$ are transmitted within the same n/2 consecutive time slots as the N/2 modulation symbols of the first data block the Alamouti mapping $D_2$, and the N/2 modulation symbols of the second block the first mapping $D_1$ are transmitted within the same n/2 consecutive time slots as the N/2 modulation symbols of the second data block the Alamouti mapping $D_2$.

Figure 13:
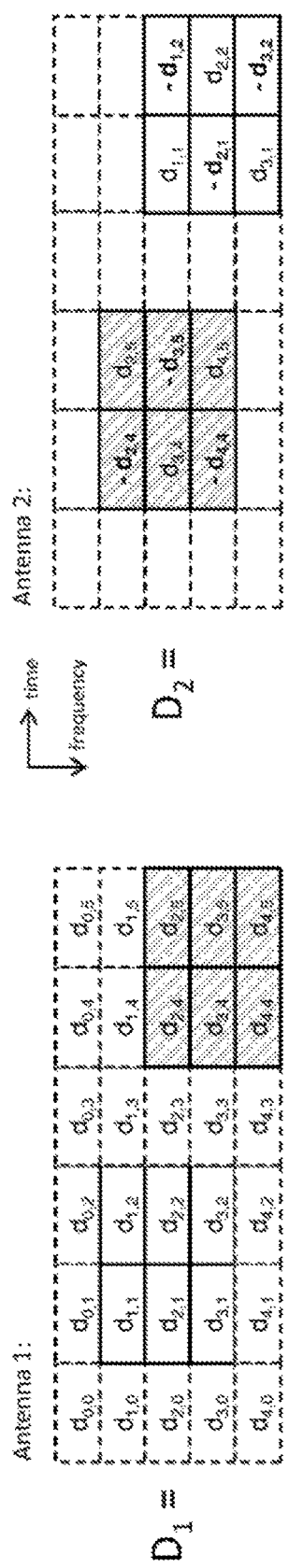
FIG. 13 shows examples of an alternative mapping of the modulation symbols of a code block to physical resources in the time-frequency domain.

Furthermore, in FIGS. 3 to 6, the N modulation symbols of the first mapping $D_1$ are transmitted on the same n consecutive time slots as the N modulation symbols of the Alamouti mapping $D_2$. As shown in FIG. 13, this is not mandatory. For example, the n/2 consecutive time slots for transmitting the N/2 modulation symbols of the first data block of the first mapping and the Alamouti mapping are spaced by at least one time slot from the n/2 consecutive time slots for transmitting the N/2 modulation symbols of the second data block of the first mapping and the Alamouti mapping.

Furthermore, in FIGS. 3 to 6, the N modulation symbols of the first mapping are transmitted on the same m consecutive carrier frequencies as the N modulation symbols of the Alamouti mapping. However, as also shown in FIG. 13, the N/2 modulation symbols of the first data block of the first mapping and the Alamouti mapping may be transmitted on m consecutive carrier frequencies that are spaced apart by at least one carrier frequency from the m consecutive carrier frequencies for transmitting the N/2 modulation symbols of the second data block of the first mapping and the Alamouti mapping. This may either yield a shift of the entire m consecutive carrier frequencies as in FIG. 13 or the m carrier frequencies may not be consecutive in the frequency domain for the first mapping $D_1$ and the Alamouti mapping $D_2$.

As noted previously, such modifications mapping of the symbols to the physical channel resources may be possible as long as channel coherence can be assumed for the transmission of the code block symbols.

It should be further noted that the individual features of the different embodiments of the aspects discussed herein may individually or in arbitrary combination be subject matter to another disclosure.

Although some aspects have been described in the context of a method, it is clear that these aspects also represent a description of the corresponding apparatus suitably adapted to perform such method. In such apparatus a (functional or tangible) block or device may correspond to one or more method step or a feature of a method step. Analogously, aspects described in the context of a corresponding block or item or feature of a corresponding apparatus may also correspond to individual method steps of a corresponding method.

Furthermore, the methods described herein may also be executed by (or using) a hardware apparatus, like a processor, microprocessor, a programmable computer or an electronic circuit. Some one or more of the most important method steps may be executed by such an apparatus. Where an apparatus has been described herein in terms of functional elements, e.g. processing unit, receiving unit, transmitter unit, or the like, it should be further understood that those elements of the apparatus may be fully or partly implemented in hardware elements/circuitry. Individual hardware, like a processor or microprocessor, a transmitter circuitry, receiver circuitry, etc., may be used to implement the functionality of one or more elements of the apparatus.

In addition, where information or data is to be stored in the process of implementing a method step of functional element of an apparatus in hardware, the apparatus may comprise memory or storage medium, which may be communicably coupled to one or more hardware elements/circuitry of the apparatus.

It is also contemplated implementing the aspects of the disclosure in hardware or in software or a combination thereof. This may be using a digital storage medium, for example a DVD, a CD, a ROM, a PROM, an EPROM, an EEPROM or a FLASH memory, having electronically readable control signals or instructions stored thereon, which cooperate (or are capable of cooperating) with a programmable computer system such that the respective method is performed. A data carrier may be provided which has electronically readable control signals or instructions, which are capable of cooperating with a programmable computer system, such that the method described herein is performed.

It is also contemplated implementing the aspects of the disclosure in the form of a computer program product with a program code, the program code being operative for performing the method when the computer program product runs on a computer. The program code may be stored on a machine readable carrier.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

What is claimed is:

1. A method for transmitting data in a real field orthogonal FBMC modulation system, the method comprising the steps of:
    forming a coding group of N modulation symbols, where N=m×n;
    generating a first mapping of the coding group of N modulation symbols in a time-frequency domain;
    generating an element-wise Alamouti mapping of the coding group of N modulation symbols; and
    transmitting the N modulation symbols of the first mapping via a first antenna, and transmitting the N modulation symbols of the element-wise Alamouti mapping via another, second antenna;
    wherein the Alamouti mapping of the coding group of N modulation symbols is representable by a second matrix, and the second matrix of the element-wise Alamouti mapping has a first block and a second block, each of the two blocks having N/2 modulation symbols and comprises a respective one of the two modulation symbols of each Alamouti pair, and
    wherein a pattern of the signs of the modulation symbols within the second block of the second matrix is opposite to the pattern of the signs of the modulation symbols within the first block of the second matrix.

2. The method according to claim 1, wherein n≥2+2k and m≥2, where k∈$\mathbb{N}$ ;
    wherein, in the second matrix, the elements of each row of the second matrix indicate n modulation symbols for transmission in respective time slots in the time domain, and the elements in each column of the second matrix indicate the m modulation symbols to be transmitted on respective subcarrier frequencies, and
    wherein the second matrix of the element-wise Alamouti mapping has a first block of N/2 modulation symbols corresponding to the modulation symbols in the $1^{st}$ to $(n/2)^{th}$ column and $1^{st}$ to $m^{th}$ row of the second matrix, and a second block of N/2 modulation symbols corresponding to the modulation symbols in the $(n/2+1)^{th}$ to $n^{th}$ column and $1^{st}$ to $m^{th}$ row of the second matrix,
    wherein the first block and the second block of the second matrix comprises a respective one of the two modulation symbols of each Alamouti pair, and
    wherein the modulation symbols with identical row index and column index within the first block and the second block of the second matrix have opposite signs.

3. The method according to claim 2, wherein the first mapping is representable by a first matrix in which the elements of each row of the first matrix indicate n modulation symbols for transmission in respective time slots in the time domain, and the elements in each column of the second matrix indicate the m modulation symbols to be transmitted on respective subcarrier frequencies,
    wherein the first matrix of the first mapping has a first block of N/2 modulation symbols corresponding to the modulation symbols in the $1^{st}$ to $(n/2)^{th}$ column and $1^{st}$ to $m^{th}$ row of the first matrix, and a second block of N/2 modulation symbols corresponding to the modulation symbols in the $(n/2+1)^{th}$ to $n^{th}$ column and $1^{st}$ to $m^{th}$ row of the first matrix;
    wherein the modulation symbols of the first block of the second matrix correspond to the modulation symbols of the second block of the first matrix and the modulation symbols of the second block of the second matrix correspond to the modulation symbols of the first block of the first matrix.

4. The method according to claim 3, wherein the first block and the second block of the first matrix comprises a respective one of the two modulation symbols of each Alamouti pair.

5. The method according to claim 3, wherein a respective Alamouti pair of modulation symbols within the second matrix has a corresponding Alamouti pair of modulation symbols within the first matrix, and the respective two corresponding Alamouti pairs in the first matrix and the second matrix form a respective Alamouti code; and
    wherein, for each Alamouti code, one of the modulation symbols within the Alamouti pair in the second matrix has the opposite sign of the corresponding modulation symbol within the Alamouti pair in the first matrix, and the other one of the modulation symbols within the Alamouti pair in the second matrix has the same sign of the corresponding modulation symbol within the Alamouti pair in the first matrix.

6. The method according to claim 1, wherein m≥2+2k and n≥2, where k∈$\mathbb{N}$ ;
    wherein, in the second matrix, the elements of each column of the second matrix indicate n modulation symbols for transmission in respective time slots in the time domain, and the elements in each row of the second matrix indicate the m modulation symbols to be transmitted on respective subcarrier frequencies, and
    wherein the second matrix of the element-wise Aamouti mapping has a first block of N/2 modulation symbols corresponding to the modulation symbols in the $1^{st}$ to $(m/2)^{th}$ row and $1^{st}$ to $n^{th}$ column of the second matrix, and a second block of N/2 modulation symbols corresponding to the modulation symbols in the $(m/2+1)^{th}$ to $m^{th}$ row and $1^{st}$ to $n^{th}$ column of the second matrix,
    wherein the first block and the second block of the second matrix comprises a respective one of the two modulation symbols of each Alamouti pair, and
    wherein the modulation symbols with identical row index and column index within the first block and the second block of the second matrix have opposite signs.

7. The method according to claim 6, wherein the mapping is representable by a first matrix in which the elements of each column of the first matrix indicate n modulation symbols for transmission in respective time slots in the time domain, and the elements in each row of the second matrix indicate the m modulation symbols to be transmitted on respective subcarrier frequencies, wherein the first matrix of the first mapping has a first block of N/2 modulation symbols corresponding to the modulation symbols in the $1^{st}$ to $(m/2)^{th}$ row and $1^{st}$ to $n^{th}$ column of the first matrix, and a second block of N/2 modulation symbols corresponding to the modulation symbols in the $(m/2+1)^{th}$ to $m^{th}$ row and $1^{st}$ to $n^{th}$ column of the first matrix;

wherein the modulation symbols of the first block of the second matrix correspond to the modulation symbols of the second block of the first matrix and the modulation symbols of the second block of the second matrix corresponds to the modulation symbols of the first block of the first matrix.

8. The method according to claim 7, wherein the first block and the second block of the first matrix comprises a respective one of the two modulation symbols of each Alamouti pair.

9. The method according to claim 7, wherein a respective Alamouti pair of modulation symbols within the second matrix has a corresponding Alamouti pair of modulation symbols within the first matrix, and the respective two corresponding Alamouti pairs in the first matrix and the second matrix form a respective Alamouti code; and wherein, for each Alamouti code, one of the modulation symbols within the Alamouti pair in the second matrix has the opposite sign of the corresponding modulation symbol within the Alamouti pair in the first matrix, and the other one of the modulation symbols within the Alamouti pair in the second matrix has the same sign of the corresponding modulation symbol within the Alamouti pair in the first matrix.

10. The method according to claim 9, wherein the modulation symbols of each Alamouti code have the same row indices and column indices in the first matrix and the second matrix.

11. The method according to claim 1, wherein the N modulation symbols of the first mapping and the N modulation symbols of the element-wise Alamouti mapping are pulse-amplitude modulated (PAM) symbols that are offset quadrature amplitude modulation (OQAM) based symbols.

12. The method according to claim 1 wherein the real field orthogonal FBMC modulation system is an OQAM/OFDM-based mobile communication system.

13. A transmitting device for transmitting data in a real field orthogonal FBMC modulation system, the device comprising:
a processing unit adapted to form a coding group of N modulation symbols, where N=m×n, wherein the processing unit is adapted to generate a first mapping of the coding group of N modulation symbols in a time-frequency domain; and to generate an element-wise Alamouti mapping of the coding group of N modulation symbols; and
a transmitter unit adapted to transmit the N modulation symbols of the first mapping via a first antenna, and to transmit the N modulation symbols of the element-wise Alamouti mapping via another, second antenna;

wherein the Alamouti mapping of the coding group of N modulation symbols is representable by a first matrix, wherein the first matrix of the element-wise Alamouti mapping has a first block and a second block, each of the two blocks having N/2 modulation symbols and comprises a respective one of the two modulation symbols of each Alamouti pair; and wherein a pattern of the signs of the modulation symbols within the second block of the first matrix is opposite to the pattern of the signs of the modulation symbols within the first block of the first matrix.

14. A receiver device for receiving data of a coding group transmitted in a real field orthogonal FBMC modulation system, the receiver device comprising:
a receiver block to receive a transmission signal comprising the data of the coding group transmitted by a transmitting device of claim 13 from a channel;
an Alamouti demapping block configured to perform an Alamouti demapping based on the received transmission signal to reconstruct estimates of N modulation symbols of the coding group from the transmission signal;
wherein the Alamouti demapping block comprises an iterative interference cancellation block configured to cancel interference within the estimates of N modulation symbols of the coding group, and
a processing unit configured to map the estimates of the N modulation symbols, in which interference has been cancelled by the iterative interference cancellation block, to the data of the code block.

15. A non-transitory computer readable medium storing instructions that, when executed by a processor of a device, cause the device to transmit data in a real field orthogonal FBMC modulation system, by:
forming a coding group of N modulation symbols, where N=m×n;
generating a first mapping of the coding group of N modulation symbols in a time-frequency domain;
generating an element-wise Alamouti mapping of the coding group of N modulation symbols;
wherein the Alamouti mapping of the coding group of N modulation symbols is representable by a first matrix, wherein the first matrix of the element-wise Alamouti mapping has a first block and a second block, each of the two blocks having N/2 modulation symbols and comprises a respective one of the two modulation symbols of each Alamouti pair;
wherein a pattern of the signs of the modulation symbols within the second block of the first matrix is opposite to the pattern of the signs of the modulation symbols within the first block of the first matrix; and
transmitting the N modulation symbols of the first mapping via a first antenna, and transmitting the N modulation symbols of the element-wise Alamouti mapping via another, second antenna.

* * * * *